United States Patent
Martinez et al.

(10) Patent No.: US 10,628,920 B2
(45) Date of Patent: Apr. 21, 2020

(54) GENERATING A SUPER-RESOLUTION DEPTH-MAP

(71) Applicant: Ford Global Technologies, LLC, Dearborn, MI (US)

(72) Inventors: Juan Castorena Martinez, Southfield, MI (US); Gintaras Vincent Puskorius, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 138 days.

(21) Appl. No.: 15/918,557

(22) Filed: Mar. 12, 2018

(65) Prior Publication Data
US 2019/0279339 A1    Sep. 12, 2019

(51) Int. Cl.
| | |
|---|---|
| G06T 3/40 | (2006.01) |
| G06T 7/521 | (2017.01) |
| G01S 17/87 | (2020.01) |
| G01S 17/42 | (2006.01) |
| G01S 17/89 | (2020.01) |

(52) U.S. Cl.
CPC ............ *G06T 3/4061* (2013.01); *G01S 17/42* (2013.01); *G01S 17/87* (2013.01); *G01S 17/89* (2013.01); *G06T 3/4076* (2013.01); *G06T 7/521* (2017.01); *G06T 2207/10028* (2013.01); *G06T 2207/30252* (2013.01)

(58) Field of Classification Search
CPC .................. G01S 17/89; G01S 17/023; G06T 2207/10028
See application file for complete search history.

(56) References Cited

U.S. PATENT DOCUMENTS

| | | | |
|---|---|---|---|
| 9,369,689 B1 | 6/2016 | Tran et al. | |
| 2003/0034988 A1* | 2/2003 | Raskar | G06T 15/503 |
| | | | 345/629 |
| 2006/0210148 A1 | 9/2006 | Nakashima | |
| 2010/0157280 A1 | 6/2010 | Kusevic et al. | |
| 2010/0296705 A1 | 11/2010 | Miksa et al. | |
| 2011/0249117 A1 | 10/2011 | Yoshihama et al. | |
| 2011/0285910 A1 | 11/2011 | Bamji et al. | |
| 2012/0081544 A1 | 4/2012 | Wee | |
| 2012/0155744 A1 | 6/2012 | Kennedy et al. | |

(Continued)

FOREIGN PATENT DOCUMENTS

WO    2017120-266 A1    7/2017

OTHER PUBLICATIONS

Kiechle et al., "A Joint Intensity and Depth Col-Sparse Analysis Model for Depth Map Super-Resolution", Computer Vision Foundation; https://www.cv-foundation.org/openaccess/content_iccv_2013/papers/Kiechle_A_Joint_Intensity_2013_ICCV_paper.pdf.

(Continued)

*Primary Examiner* — Ross Varndell
(74) *Attorney, Agent, or Firm* — Frank A. MacKenzie; Bejin Bieneman PLC

(57) ABSTRACT

A system and methods are described for generating a super-resolution depth-map. A method includes: determining a plurality of unmeasured depth-map positions using measured depth-elements from a first sensor and spatial-elements from a second sensor; for each of the plurality, calculating estimated depth-elements using a gradient-based optimization; and generating a super-resolution depth-map that comprises the measured and estimated depth-elements.

17 Claims, 6 Drawing Sheets

(56) References Cited

U.S. PATENT DOCUMENTS

| | | |
|---|---|---|
| 2014/0139639 A1 | 5/2014 | Wagner et al. |
| 2014/0368615 A1* | 12/2014 | van Baar ................ G06T 7/593 |
| | | 348/48 |
| 2015/0294473 A1* | 10/2015 | Michot ................... G06T 5/005 |
| | | 382/154 |
| 2017/0061632 A1 | 3/2017 | Lindner et al. |
| 2017/0148168 A1* | 5/2017 | Lindner ................ G06T 7/0002 |
| 2017/0180639 A1 | 6/2017 | Kamilov et al. |
| 2017/0200273 A1* | 7/2017 | Kamilov ............ H04N 5/23232 |
| 2017/0365068 A1* | 12/2017 | Tan ...................... H04N 13/271 |
| 2019/0114391 A1* | 4/2019 | Jaganathan .......... G06N 3/0472 |

OTHER PUBLICATIONS

Maddern et al., "Real-time probabilistic fusion of sparse 3D LIDAR and dense stereo", http://www.robots.ox.ac.uk/~mobile/Papers/2016IROS_maddern.pdf.

\* cited by examiner

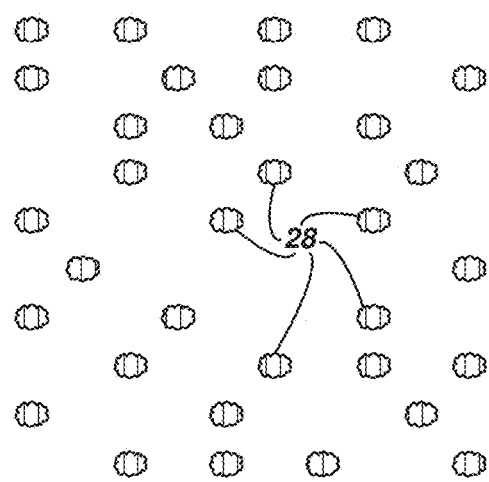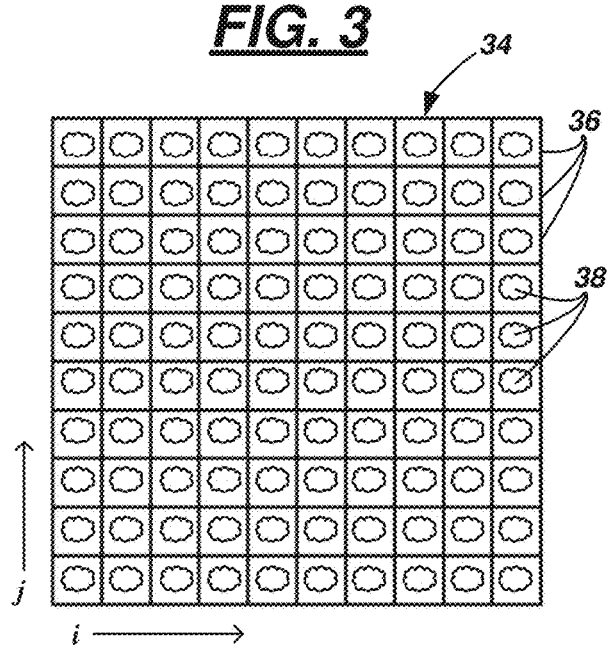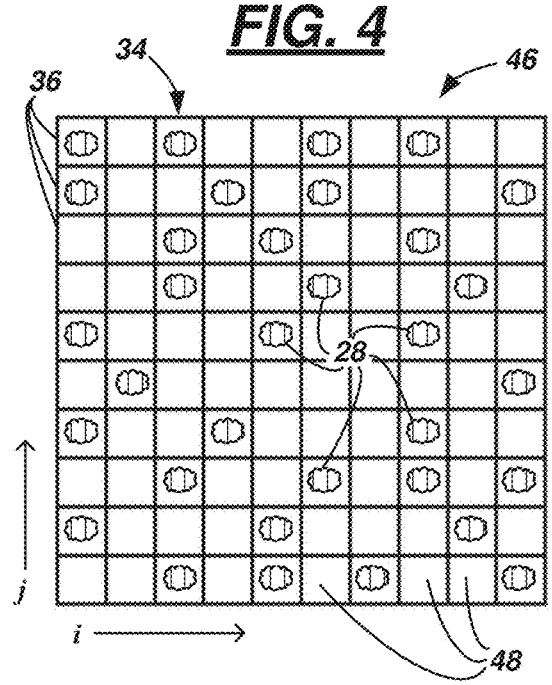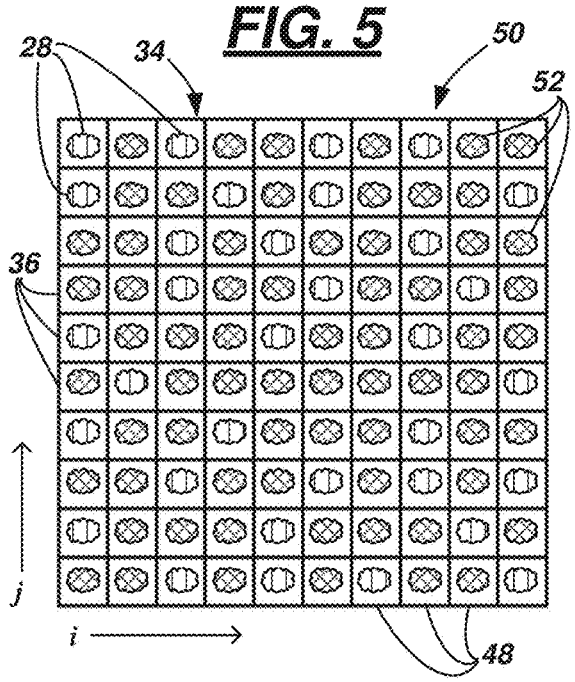

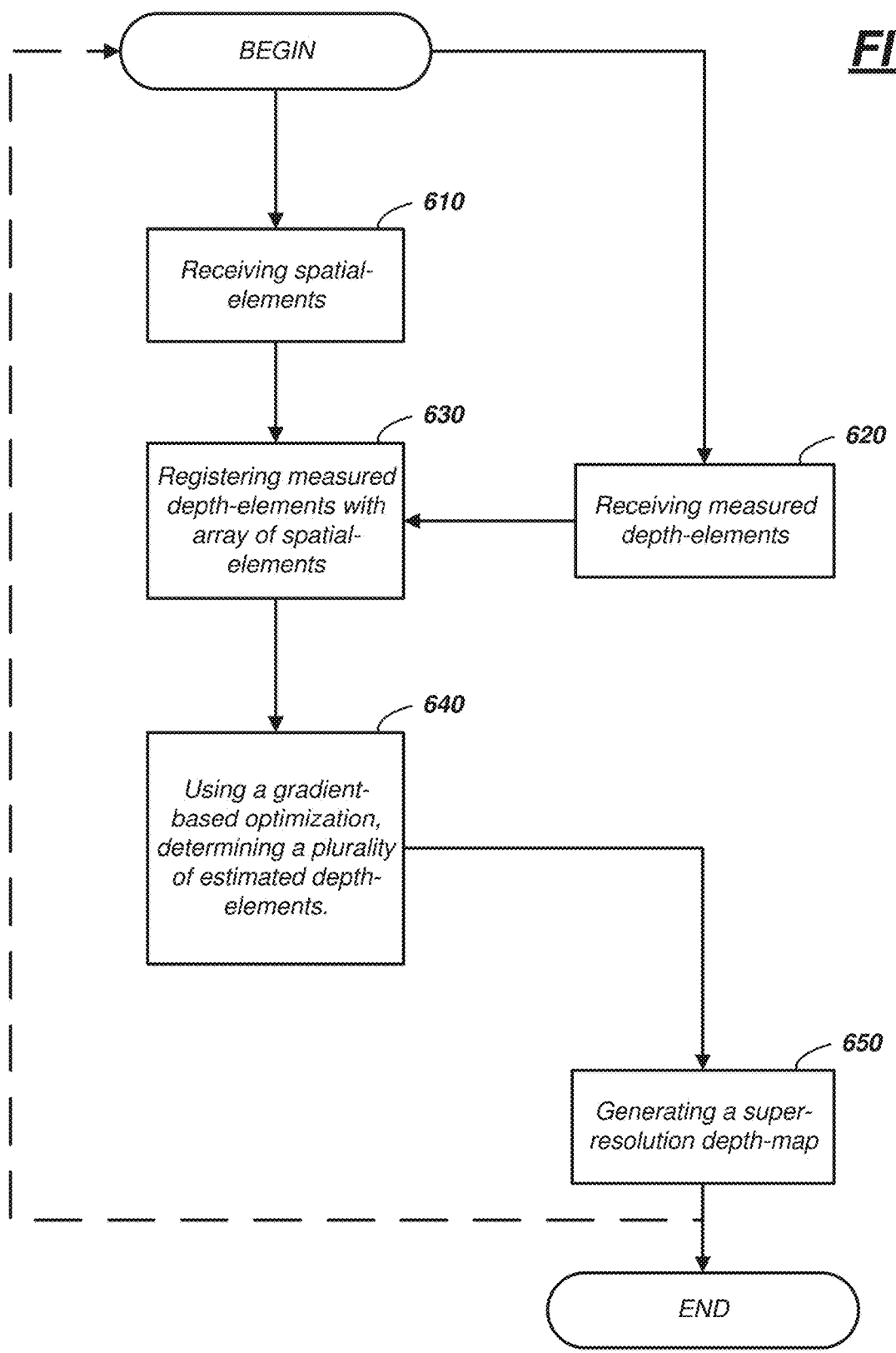

GENERATING A SUPER-RESOLUTION DEPTH-MAP

BACKGROUND

Modern light detection and ranging (LIDAR) devices have less resolution than modern camera imaging devices. Relatively less depth resolution in LIDAR devices (e.g., than image resolution in camera devices) can equate to less situational awareness, particularly in situations where an environment of the LIDAR devices is often changing.

BRIEF DESCRIPTION OF THE DRAWINGS

FIG. 2 illustrates a plurality of measured depth-elements.

FIG. 3 illustrates a plurality of measured spatial-elements arranged within an array.

FIG. 4 illustrates the measured depth-elements matched within the array of FIG. 3.

FIG. 5 illustrates a super-resolution depth-map comprising the plurality of measured depth-elements and a plurality of estimated depth-elements (calculated using the computer of FIG. 1).

FIG. 6 is a flow diagram illustrating a process for generating an estimation of the super-resolution depth-map.

DETAILED DESCRIPTION

Figure 1:
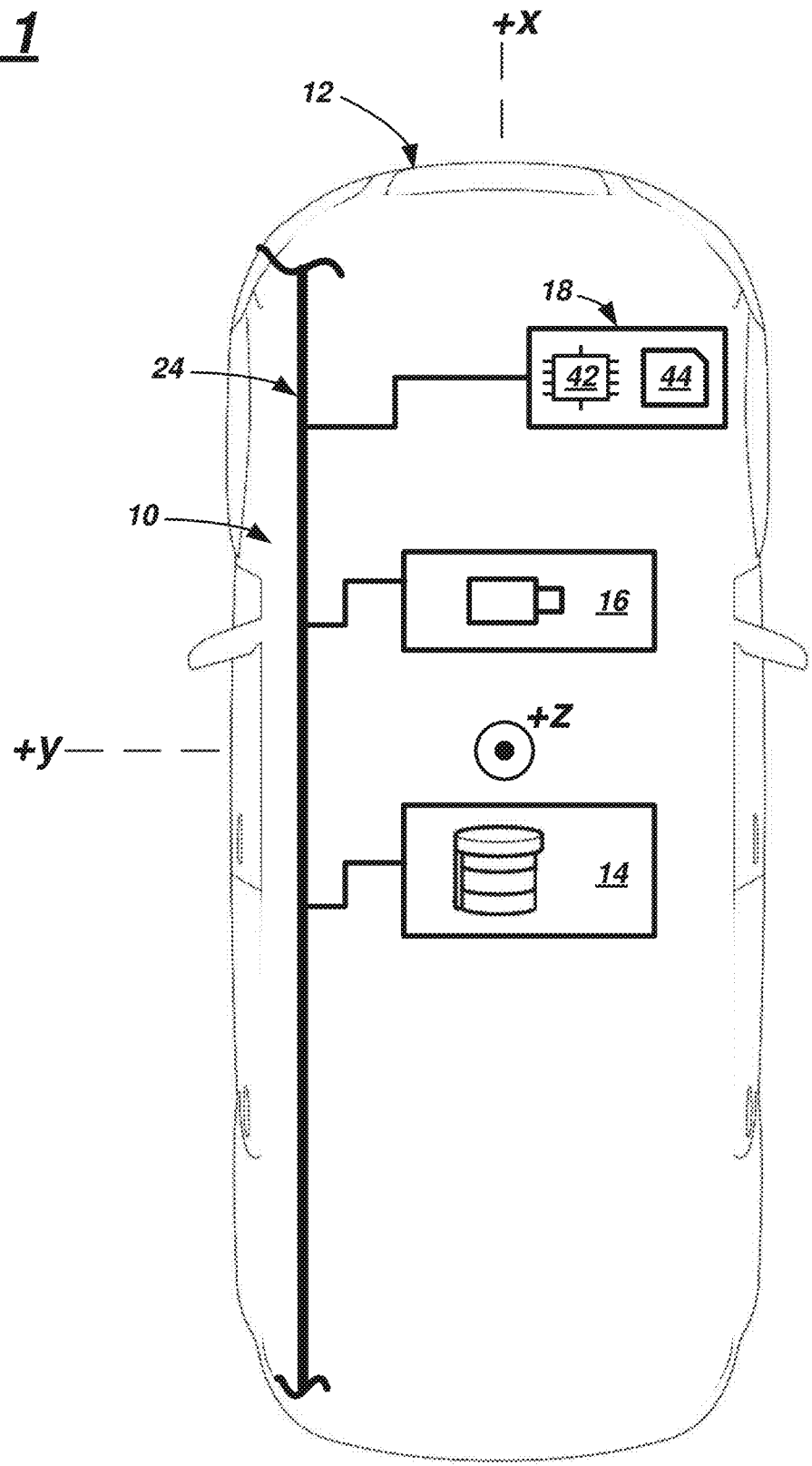
FIG. 1 is a schematic diagram illustrating a vehicle comprising a computer, a first sensor, and a second sensor.

A depth-resolving system is described that includes a first sensor, a second sensor, and a computer that receives data from the first and second sensors. The computer may be programmed to generate a super-resolution depth-map using the data. And several methods of generating the super-resolution depth-map are described. According to one illustrative example, the method comprises: determining a plurality of unmeasured depth-map positions using measured depth-elements from a first sensor and spatial-elements from a second sensor; for each of the plurality, calculating estimated depth-elements using a gradient-based optimization; and generating a super-resolution depth-map that comprises the measured and estimated depth-elements.

According to the at least one example set forth above, the first sensor is a light detection and ranging (LIDAR) device, wherein the second sensor is a camera.

According to the at least one example set forth above, further comprising registering the spatial-elements with the measured depth-elements, wherein the plurality of unmeasured depth-map positions are indexed positions of an array of the spatial-elements which do not have a corresponding measured depth-element.

According to the at least one example set forth above, in the super-resolution depth-map, each of the measured and estimated depth-elements correspond with a unique pixel location of an array of spatial-elements received from the second sensor.

According to the at least one example set forth above, calculating estimated depth-elements further comprises, with respect to each unmeasured depth-map position, quantifying a strength of a depth discontinuity with respect to neighboring pixel locations.

According to the at least one example set forth above, the optimization comprises determining a minima of a cost function.

According to the at least one example set forth above, the optimization comprises:

$$\hat{x} = \arg\min_{x \in X_\Omega} \|Dx\|_{l_2},$$

subject to $x_\Omega = y_\Omega$, wherein $\hat{x}$ is the super-resolution depth-map, wherein $x$ is a multi-dimensional variable representing the depth-map image to be estimated, wherein $y$ comprises a set of measured depth-elements, wherein $D$ is a gradient operator, wherein $\|x\|_{l_2}$ is an $l_2$-norm, and wherein $\Omega$ represents a set of pixel indices associated with the measured depth-elements.

According to the at least one example set forth above, the optimization comprises determining a convergence of $s_{\Omega'}^t = s_{\Omega'}^{t-1} - \gamma I_{\Omega'} \nabla f(s^{t-1})$.

According to the at least one example set forth above, wherein $s_{\Omega'}^t$ is repeatedly determined until convergence is determined or convergence within a threshold (T) is determined.

According to the at least one example set forth above, the optimization comprises determining a convergence of $s_{\Omega'}^t = (1 + \lambda_r) z_{\Omega'}^t - \lambda_r z_{\Omega'}^{t-1}$.

According to the at least one example set forth above, wherein $z_{\Omega'}^t$ is repeatedly determined until convergence is determined or convergence within a threshold (T) is determined.

According to the at least one example set forth above, determining the convergence comprises using a Nesterov method for solving a convex programming problem with a convergence rate $[O(1/k^2)]$.

According to the at least one example set forth above, further comprising fusing the super-resolution depth-map with the spatial-elements.

According to the at least one example set forth above, further comprising navigating a vehicle in an autonomous mode using the super-resolution depth-map.

According to another illustrative example, a computer comprising a processor and memory storing instructions executable by the processor is described. The instructions comprise to: determine a plurality of unmeasured depth-map positions using measured depth-elements from a first sensor and spatial-elements from a second sensor; for each of the plurality, calculate estimated depth-elements using a gradient-based optimization; and generate a super-resolution depth-map that comprises the measured and estimated depth-elements.

According to the at least one example set forth above, the instructions further comprise, to: register the spatial-elements received from the second sensor with the measured depth-elements, wherein the plurality of unmeasured depth-map positions are indexed positions of an array of the spatial-elements which do not have a corresponding measured depth-element.

According to the at least one example set forth above, in the super-resolution depth-map, each of the measured and estimated depth-elements correspond with a unique pixel location of an array of spatial-elements received from the second sensor.

According to the at least one example set forth above, the instruction to calculate estimated depth-elements further comprises, to: with respect to each unmeasured depth-map position, quantify a strength of a depth discontinuity with respect to neighboring pixel locations.

According to the at least one example set forth above, the optimization comprises:

$$\hat{x} = \underset{x \in X_\Omega}{\arg\min} \|Dx\|_{l_2},$$

subject to $x_\Omega = y_\Omega$, wherein $\hat{x}$ is the super-resolution depth-map, wherein x is a multi-dimensional variable representing the depth-map image to be estimated, wherein y comprises a set of measured depth-elements, wherein D is a gradient operator, wherein $\|x\|_{l_2}$ is an $l_2$-norm, and wherein $\Omega$ represents a set of pixel indices associated with the measured depth-elements.

According to the at least one example set forth above, the instructions further comprise to: determine a convergence with respect to values of the estimated depth-elements; and use a Nesterov method for a respective convergence rate.

According to the at least one example, a computer is disclosed that is programmed to execute any combination of the instruction examples set forth above.

According to the at least one example, a computer is disclosed that is programmed to execute any combination of the method examples set forth above.

According to the at least one example, a computer program product is disclosed that includes a computer readable medium storing instructions executable by a computer processor, wherein the instructions include any combination of the instruction or method examples set forth above.

Turning now to the figures, wherein like elements refer to similar or identical features or functions, a depth-resolving system 10 is illustrated. The system 10 is illustrated as part of a vehicle 12 which may use the system 10 for autonomous navigation or the like. It should be appreciated that a vehicle-implementation is merely one environment, and other environments are possible—including any suitable surveillance system, situational awareness system, safety system, or the like coupled to or carried by a mobile device, a portable device, or a static structure (e.g., static structures including but not limited to vehicle-related infrastructure or infrastructure unrelated to vehicles).

According to the illustrated example, the depth-resolving system 10 comprises two sensors 14, 16 and a computer 18. A first sensor 14 (e.g., a light detection and ranging device) may be configured to provide depth data to computer 18, and a second sensor 16 (e.g., a camera) may be configured to provide spatial data to the computer 18. According to at least one illustrative example, the first and second sensors 14, 16 receive depth and spatial data (respectively) of at least a portion a common scene within their respective surroundings. The computer 18 may be programmed to perform a registration (also, sometimes referred to as a calibration) of the depth data and the spatial data—i.e., elements of the depth data may be projected onto elements of the spatial data resulting in a match or otherwise determination regarding which of the measured depth-elements correspond with the measured spatial-elements with respect to the scene. Typically, and based on the current state of the art, a spatial-resolution parameter of the second sensor 16 is larger than a corresponding resolution parameter of the first sensor 14. Consequently, there are more spatial-elements (for a given scene) than depth-elements (of the scene). And as will be appreciated by skilled artisans, the greater the available resolution, the more an observer (e.g., human, computer 18, etc.) will be able to resolve detail(s) regarding the scene.

As used herein, those spatial-elements for which there is a corresponding measured depth-element in the two-dimensional spatial-element array are referred to as matched (e.g., matched elements) by computer 18, while those spatial-elements having no corresponding measured depth-element are referred to herein as unmeasured depth-map positions. Following registration, and as will be described in detail below, the computer 18 may be programmed with instructions to perform a gradient based optimization to estimate depth values that correspond to the plurality of unmeasured depth-positions. Accordingly, in real-time, the computer 18 may generate and/or output a so-called super-resolution depth-map that comprises a composite of measured depth-elements (measured by the first sensor 14) and estimated depth-elements (calculated by computer 18 for the unmeasured depth-positions). Thus, prior to this process, the computer may receive a so-called sparse-depth map (e.g., low depth resolution), and following the process, the computer may have generated the super-resolution depth-map (e.g., high depth resolution). Further, the (high-resolution) super-resolution depth-map may have a same or similar resolution as that of the second sensor 16. In this manner, depth data and spatial data may be fused (e.g., one-to-one matching) enhancing the information available to the computer regarding its environment.

In the exemplary environment of vehicle 12, this may be used to navigate autonomously vehicle 12. And in other environments, it may be used to improve situational awareness, improve detection of various objects which are challenging to detect using spatial data alone, perform other tasks, etc.

A description of an example vehicle environment follows. Thereafter, examples of methods to determine estimated depth-elements and/or output super-resolution depth-maps will be described.

FIG. 1 illustrates vehicle 12 which comprises depth-resolving system 10. Vehicle 12 is shown as a passenger car; however, vehicle 12 could also be a truck, sports utility vehicle (SUV), recreational vehicle, bus, train car, aircraft, or the like that includes the depth-resolving system 10. According to one non-limiting example, vehicle 12 is an autonomous vehicle—i.e., it operates in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more drivingrelated tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

In other examples, vehicle 12 is not a fully autonomous vehicle. For instance, vehicle 12 may operate in a partially autonomous or non-autonomous mode (e.g., one of levels 0-5) instead.

As discussed in part above, system 10 may comprise first sensor 14, second sensor 16, and computer 18, as well as any suitable wired or wireless network connection 24 enabling communication between the devices 14, 16, 18 and any other electronic devices (not shown) onboard vehicle 12. In at least one example, the connection 24 includes one or more of a controller area network (CAN) bus, Ethernet, Local Interconnect Network (LIN), a fiber optic connection, or the like. Other examples also exist. For example, alternatively or in combination with e.g., a CAN bus, connection 24 could comprise one or more discrete wired or wireless connections.

First sensor 14 may be any suitable electronic device configured and/or programmed to determine a spatial distance between a receiver (not shown) of the sensor 14 and an object in the scene (spaced therefrom). According to one non-limiting example, the first sensor 14 is a light detection and ranging (LIDAR) device. LIDAR devices are active sensing devices; i.e., they emit electro-magnetic radiation signal from an emitter at a time ($t_0$) and receive at a receiver a return or reflection of the emitted signal at a time ($t_1$)—thereby using the properties of light and time differential ($\Delta t$ or $t_1-t_0$) to determine a distance between the LIDAR device and the object off which the signal reflected. The depth data received from LIDAR devices may be referred to as a point cloud data (i.e., as used herein, point-cloud data comprises a set of data points (referred to herein as measured depth-elements) in a predetermined coordinate system). In general, LIDAR devices are known to skilled artisans; hence, they will not be discussed in greater detail here. It should be appreciated that a LIDAR device is merely one example of a first sensor 14; other distance-measuring devices (e.g., radio detection and ranging (radar) devices, sonar devices, etc.) could be employed instead.

FIG. 2 illustrates a portion a point cloud data 26. A small portion of an entire point cloud is shown here for purposes of illustration only. The point cloud data 26 comprises a plurality of measured depth-elements 28. As used herein, a measured depth-element is a unit of data received from first sensor 14, wherein said unit of data comprises a spatial measurement defining a distance between the first sensor 14 and an object off which an energy transmission reflects and returns to the first sensor 14.

Second sensor 16, shown in FIG. 1, may be any suitable electronic device configured and/or programmed to receive light energy and detect different bands of light within the electromagnetic spectrum. According to one non-limiting example, the second sensor 16 is a camera. Non-limiting examples of cameras include complementary metal oxide semiconductor (CMOS) devices, charge-coupled devices (CCDs), other passive sensing devices, active sensing devices, passive and active sensing devices (i.e., both), and the like. Cameras are known to skilled artisans; hence, they will not be discussed in greater detail here either.

For purposes of illustration only, second sensor 16 may output a two-dimensional array of spatial-elements to computer 18—the size and shape of the array being a property of the particular second sensor 16. For purposes of illustration only, a non-limiting example of a portion of a two-dimensional 34 is shown in FIG. 3 (e.g., an array 34 of 10×10 pixels 36). Entire pixel arrays are typically much larger and may have high-resolution (e.g., high-resolution arrays may be larger than 1600×1200 pixels and have a relatively high pixel density (i.e., quantity of pixels per unit area)). For purposes of explaining the present disclosure only, a portion of array 34 will be shown. FIG. 3 illustrates that each pixel 36 may comprise a spatial-element 38; as used herein, a spatial-element is a unit of data received using a pixel or pixel-like region of second sensor 16, wherein said unit of data comprises a measurement of electromagnetic (EM) energy associated with a reflection or emission from the surrounding scene (accordingly, such spatial-elements also may be referred to as measured spatial-elements, as second sensor 16 quantifies the received EM energy). In at least one example, the EM energy received did not originate from the second sensor 16 (i.e., sensor 16, in at least one example, is not an active sensing device).

Returning again to FIG. 1, computer 18 comprises at least one processor 42 and memory 44. Processor 42 may be programmed to process and/or execute digital instructions to carry out at least some of the tasks described herein. Non-limiting examples of processor 42 include a microprocessor, a microcontroller or controller, an application specific integrated circuit (ASIC), etc.—just to name a few. And a few non-limiting examples of digitally-stored instructions—storable in memory 44 and executable by processor 42—include, to: receive measured depth-elements from first sensor 14; receive spatial-elements from second sensor 16; register the received spatial-elements with corresponding measured depth-elements; determine a plurality of unmeasured depth-map positions; calculate estimated depth-elements for the plurality of unmeasured depth-map positions; and generate a super-resolution depth-map that comprises a composite of the measured depth-elements (e.g., received from first sensor 14) and the estimated depth-elements (calculated by computer 18). Additional and more specific examples of instructions which may be used instead of and/or in addition to these examples, as well as sequences of instructions, are described in the one or more processes below.

As will be described more below, FIG. 4 illustrates a registration 46 of measured depth-elements 28 (of point cloud data 26) with the array 34 of pixels 36 which comprise the spatial-elements 38 (however here, the spatial-elements 38 are hidden for clarity). As will be discussed more below, with respect to a common scene (from which first sensor 14 receives depth data and second sensor 16 receives spatial data), spatial-elements 38 are matched with corresponding measured depth-elements 28. As used herein, indexed positions in the array 34 in which spatial-elements 38 are not matched with a corresponding measured depth-element are referred to as unmeasured depth-map positions 48. As will be described more below, the computer 18 will calculate estimated depth-elements (e.g., depth values) for these unmeasured depth-map positions 48 in order to generate a super-resolution depth-map.

Further, FIG. 5 illustrates an exemplary super-resolution depth-map 50 (or at least a portion thereof). As also will be described more below, the illustrated map 50 comprises a composite of measured depth-elements 28 and a plurality of estimated depth-elements 52 in positions 48. As used herein, a super-resolution depth-map is a depth map that has an actual (e.g., measured) data-point density (from first sensor 14), for a portion of a captured scene, that matches an estimated (e.g., calculated) spatial-point density (from second sensor 16). For example, given identical fields of view (for sensor 14 and sensor 16), the super-resolution depth-map would have the same resolution (e.g., quantity of data points) as a pixel array of the field of view of sensor 16.

Memory 44 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 44 may store one or more computer program products which may be embodied as software, firmware, or other programming instructions executable by the processor 42.

Figure 9:
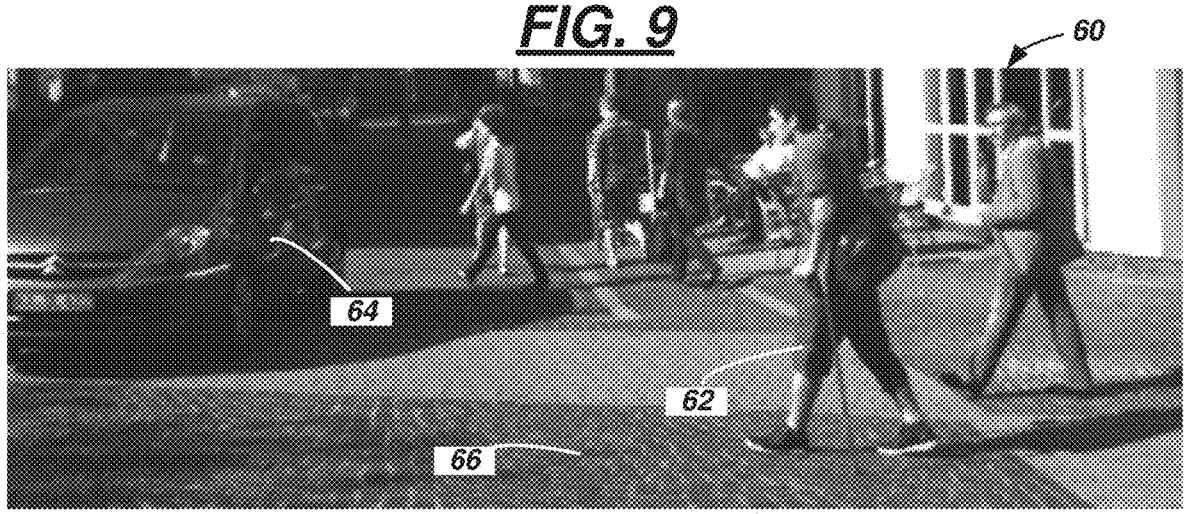
FIG. 9 illustrates an exemplary scene embodied as spatial data, the spatial data comprising a plurality of spatial-elements.
Figure 10:
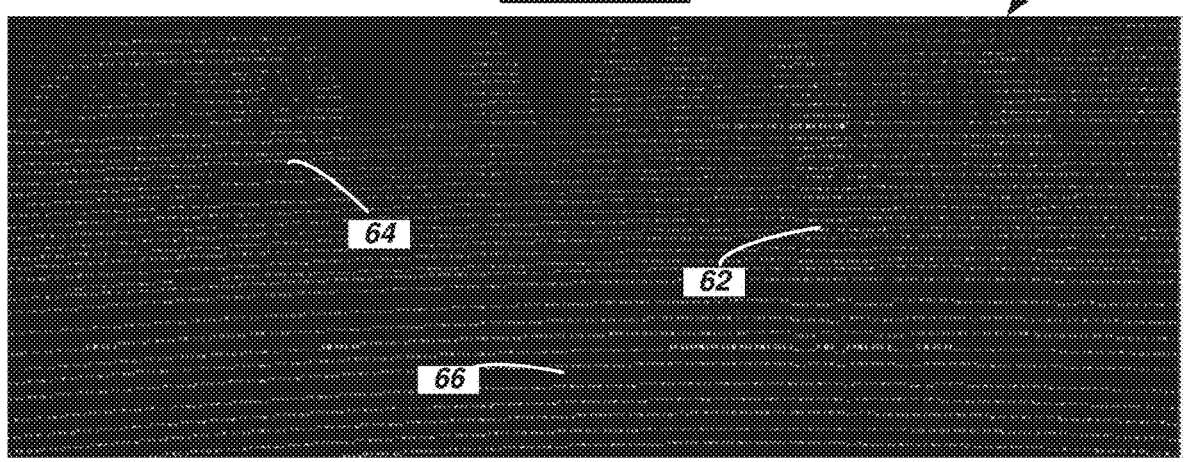
FIG. 10 illustrates the exemplary scene of FIG. 9 embodied as depth data, the depth data comprising a plurality of measured depth-elements.
Figure 11:
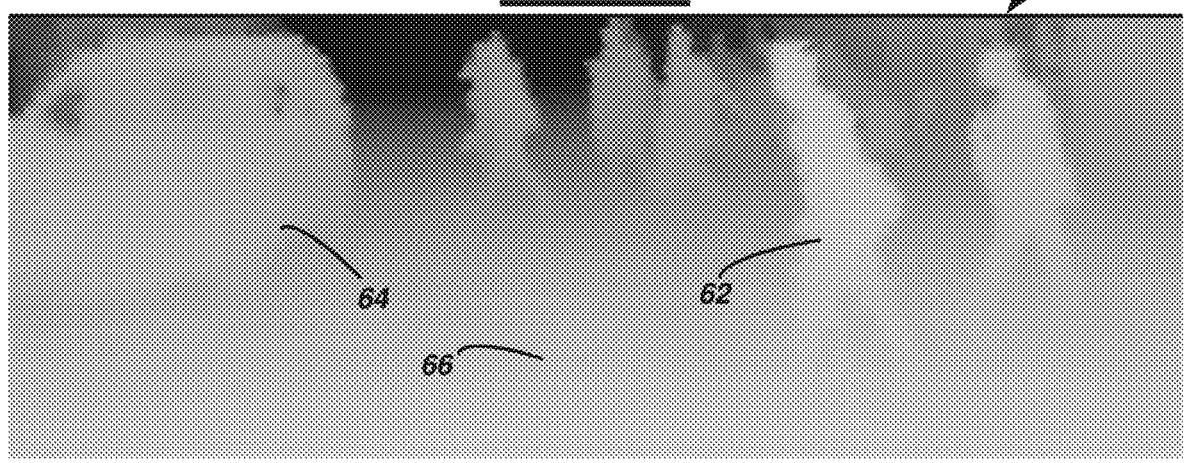
FIG. 11 illustrates the exemplary scene of FIG. 9 embodied as an estimation of a super-resolution depth-map, the super-resolution depth-map comprising the plurality of measured depth-elements and a plurality of estimated depth-elements.

Turning now to FIG. 6, a process 600 executable by the computer 18 is illustrated. Using process 600, computer 18 may generate and/or output a super-resolution depth-map 50. Process 600 begins with block 610 wherein computer 18 receives spatial-elements 38 (from second sensor 16) of a common scene 60. An exemplary common scene 60 is shown in FIGS. 9-11; as used herein, a common scene is a concurrent observation by the first and second sensors 14, 16, wherein both sensors 14, 16 receive information regarding a common region of their respective environments. For example, the field of view of the first sensor may at least partially overlap with the field of view of the second sensor 16. As shown in FIG. 3, the spatial-elements 38 may be arranged according to array 34, and the array 34 may be indexed in any suitable manner; e.g., a horizontal axis may be identified using a label i and a vertical axis may be identified using a label j. Accordingly, any pixel 36 may be identified by its pixel location (i, j). And as described below, any unmeasured depth-map position 48 also can be identified by its respective pixel location (i, j).

In block 620, computer 18 may receive point cloud data 26—e.g., receive the measured depth-elements 28 from first sensor 14. As shown in FIGS. 2-3, for a common scene, the relative density of the measured depth-elements 28 with respect to the corresponding spatial-elements 38 may be sparse, as the resolution of depth data (e.g., for LIDAR devices) is typically less than that of spatial data (e.g., for cameras).

Upon receiving both spatial-elements 38 and measured depth-elements 28, in block 630, the computer 18 may perform registration 46 (e.g., shown in part in FIG. 4). While the spatial-elements 38 are hidden in FIG. 4, it will be appreciated that the measured depth-elements 28 are mapped to the corresponding pixel locations (i, j) of the array 34, as discussed above. Registration further may comprise identifying the plurality of unmeasured depth-map positions 48—e.g., by computer 18 determining which pixel locations do not have a corresponding measured depth-element 28.

In block 640, computer 18 applies an iterative gradient-based optimization and calculates a plurality of estimated depth-elements; as used herein, the estimated depth-elements are computer-calculated depth values for the unmeasured depth-map positions 48 (see FIGS. 4-5). Examples of how block 640 is determined will be explained in greater detail below with respect to FIGS. 7 and 8.

In block 650 which follows block 640, computer 18 may generate the super-resolution depth-map 50. For example, as computer 18 may temporarily store the measured depth-elements 28 for a given scan, it may merge these depth values with the estimated depth-elements. Block 650 will be described more below with respect to FIGS. 7-8 as well. According to at least one example, block 650 comprises outputting the generated super-resolution depth-map 50 to another computing device (e.g., via network connection 24). However, in other examples, computer 18 does not output the map 50. For example, computer 18 may use the super-resolution depth-map 50 internally—e.g., computer 18 also may be programmed to execute one or more autonomous driving functionalities, and the super-resolution depth-map 50 may be used by computer 18 to determine how to navigate the vehicle 12.

It should be appreciated that process 600 may be repeated numerous times during an ignition cycle. For example, a single iteration of blocks 610-650 may provide a super-resolution depth-map 50 for a single instant in time. For example, FIG. 9 illustrates an example of a plurality of spatial-elements (e.g., an image within scene 60) received at computer 18 from second sensor 16 (block 610). FIG. 10 illustrates an example of a plurality of measured depth-elements (e.g., sparse depth map of the same scene 60) received at computer 18 from first sensor 14 (block 620). And FIG. 11 illustrates an example of an outputted super-resolution depth-map 50 for scene 60—comprising both the measured depth-elements (of FIG. 10) and the estimated depth-elements 52 for the plurality of unmeasured depth-map positions 48 (e.g., the estimated depth-elements 52 being determined by computer 18 in block 640). Note: in FIG. 11, darker regions are farther away from first sensor 14, while lighter regions are closer to first sensor 14.

FIGS. 9-11 illustrate a single scene at such a single instant in time. However, some of the objects 62, 64 (e.g., person 62, vehicle 64) may be moving; thus, it may be desirable to repeatedly execute blocks 610-650. In autonomous vehicle environments, movement of objects 62, 64, 66 (e.g., ground 66) may be relative—e.g., as the vehicle 12 and/or the objects themselves (e.g., 62, 64) may be moving. Thus, following block 650, process 600 may loop back to the beginning and repeat each of the blocks described above so that computer 18 or other onboard systems may have update-to-date information regarding the objects 62-66 surrounding the vehicle 12.

Figure 7:
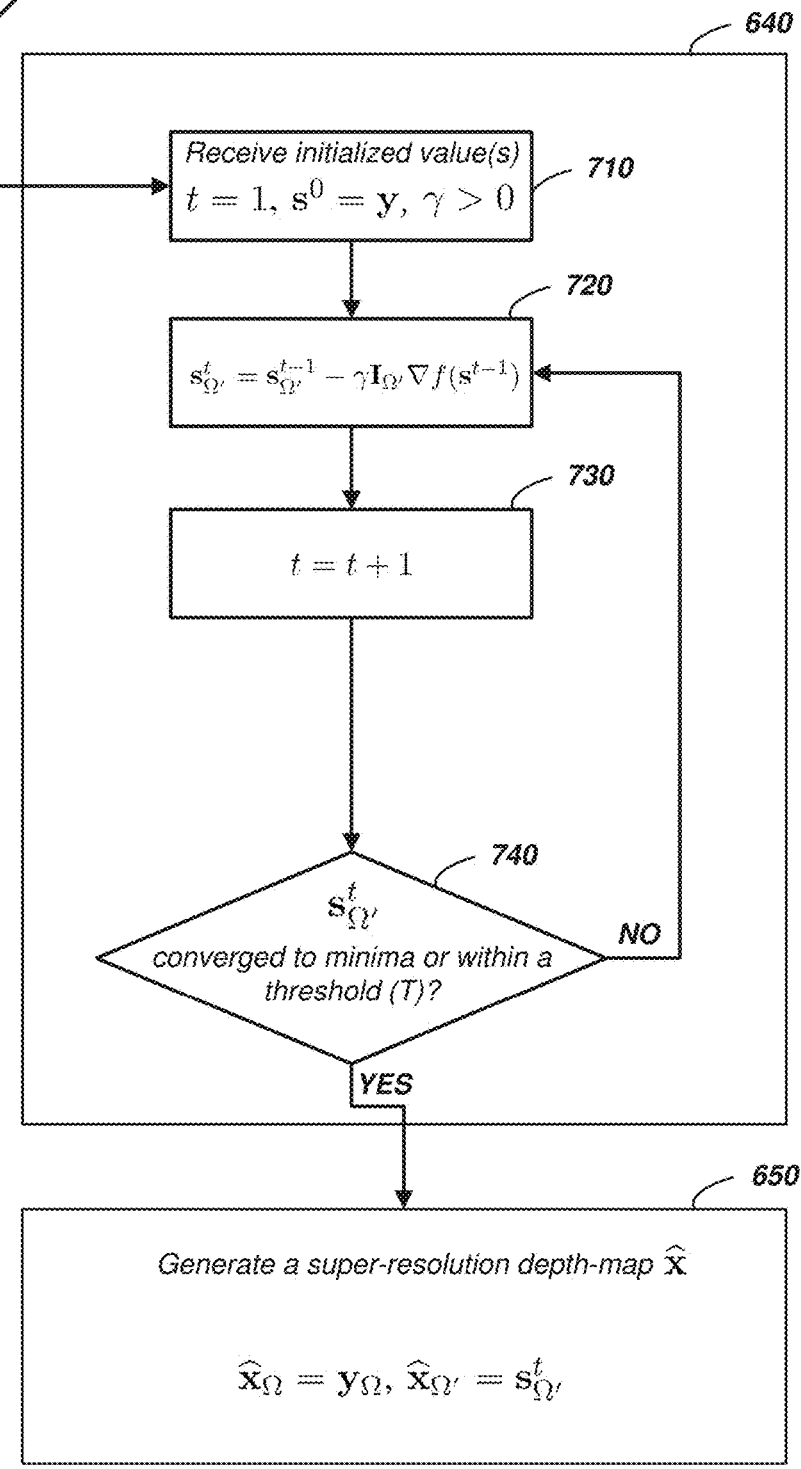
FIG. 7 illustrates one example of executing a portion of the process shown in FIG. 6.
Figure 8:
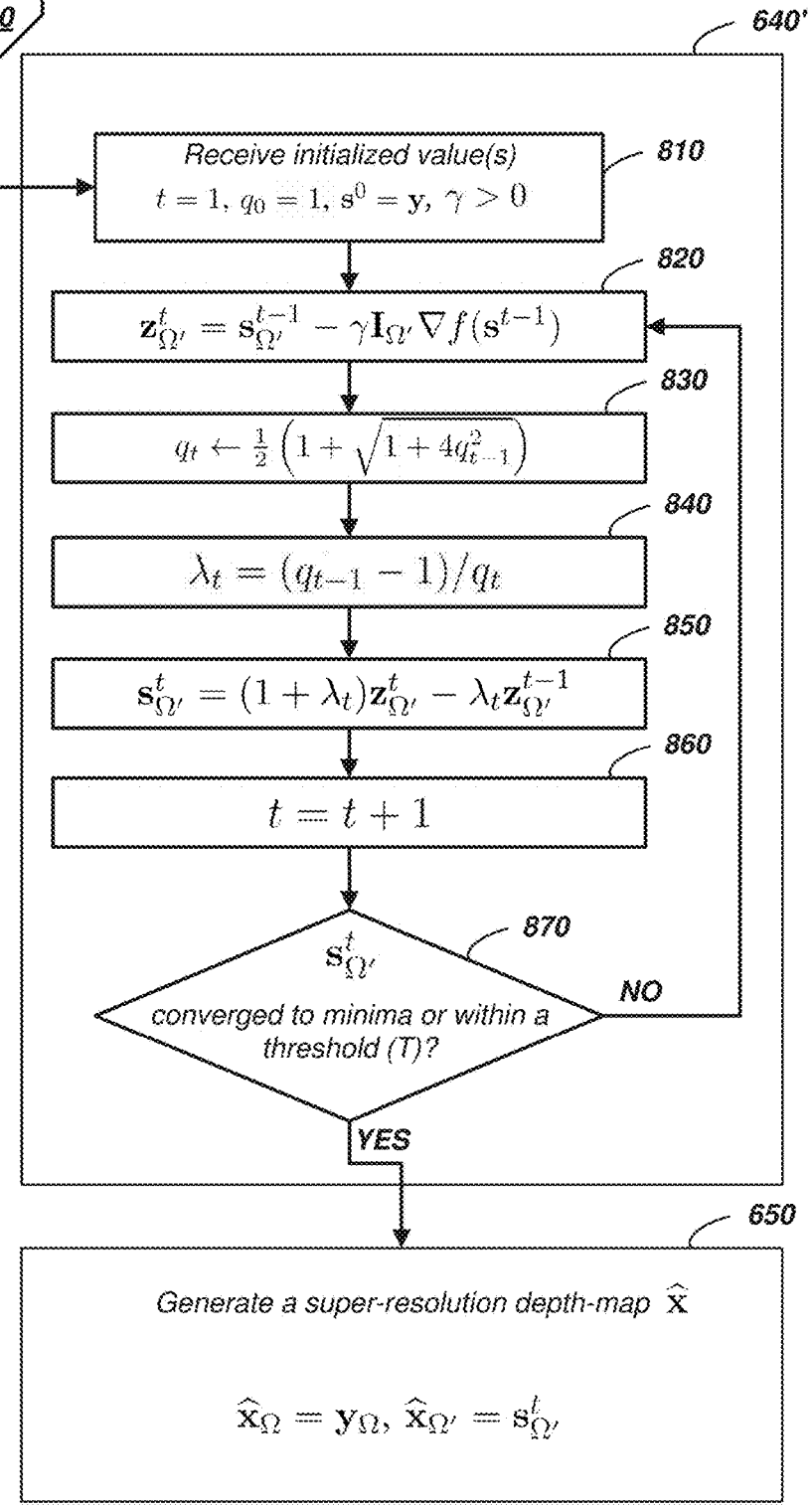
FIG. 8 illustrates another example of executing the portion of the process shown in FIG. 6.

FIG. 7 and FIG. 8 each illustrate techniques for determining a gradient-based optimization (FIG. 6, 640) and generating a super-resolution depth-map 50 (FIG. 6, 650). Each will be discussed in turn.

In FIG. 7, block 640 may comprise several exemplary blocks 710, 720, 730, and 740. In general, blocks 640 and 650 collectively determine Equation (1), which determines a minimum of $f(x)$, wherein $f(x)$ is a first constraint in a cost function (e.g., also referred to as a loss function), wherein $f(x)=\|Dx\|_{l_2}$. (Note: while an $l_2$-norm is used, this is merely an example; e.g., an $l_1$-norm or the like may be used instead.)

$$\hat{x} = \underset{x \in x_{\Omega'}}{\arg\min} \|Dx\|_{l_2}, \quad \text{Equation (1)}$$

wherein x is a multi-dimensional variable representing the depth-map image to be estimated representing a theoretical high-resolution depth map (50), according to a constraint set forth in Equation (2)

$$x_\Omega y_\Omega \quad \text{Equation (2)}$$

With respect to Equations (1) and (2), $\Omega$ represents a set of pixel indices associated with the measured depth-elements 28, and $\Omega'$ represents a set of pixel indices associated with the unmeasured depth-map positions 48. Thus, $y_\Omega$ represents a set of measured depth-elements 28 (e.g., received from a relatively low-resolution LIDAR device, registered, and mapped to array 34), and $x_\Omega$ represents a set of generated measured depth-elements 28 (e.g., in the super-resolution depth-map 50, corresponding to the unmeasured depth-map positions 48), as explained more below. Further, $\hat{x}$ represents a calculated (e.g., estimated) super-resolution depth-map 50, which according to one example, comprises a combination of $y_\Omega$ (Equation 2) and $s_{\Omega'}^t$ (see Equation 4 below).

Returning to Equation (1), D is a mathematical gradient operator which may quantify at each unmeasured depth-map position 48 the strength of depth discontinuity with respect to neighboring pixel locations—e.g., in the $D_h$ (horizontal) and $D_v$ (vertical) directions, as shown in Equation (3). Further, $\|x\|_{l_2}$ represents an $l_2$-norm defined for vector x as $\Sigma_{n=1}^{N} x_n^2$, where N is a quantity of scalar elements $x_n$.

$$D = \begin{bmatrix} D_h \\ D_v \end{bmatrix} \quad \text{Equation (3)}$$

In order to estimate $\hat{x}$ in Equation (1), computer 18 may execute blocks 710-740. For example, in block 710, computer 18 may initialize several values: t (an optimization iteration value) may be set to 1, $s^0$ (an optimization transform iteration value) may be set to y, and $\gamma$ (a predetermined, positive scalar value that represents a learning rate of gradient descent (e.g., a strength of a contribution of a cost function (described below) with respect to the optimization) may be set to a value greater than zero. Each of these values may be stored in memory 55. The $\gamma$ value may be preconfigured so as to balance a quality of super-resolution depth-map 50 reconstruction with convergence duration.

In block 720 which follows, computer 18 may execute Equation (4) below.

$s_{\Omega'}^t = s_{\Omega'}^{t-1} - \gamma I_{\Omega'} \nabla f(s^{t-1})$, wherein $s_{\Omega'}^t$ comprises a depth-map estimatation, or more particularly an estimation of the values of estimated depth-elements 52    Equation (4)

With respect to Equation (4), $I_{\Omega'}$ represents a function that selects only the pixel locations defined by $\Omega'$ (e.g., unmeasured depth-map positions 48). $\nabla$ is a gradient operator of a cost function. For example, a cost function is a function that maps values of one or more variables onto a real number and thereby representing some cost (or loss) associated with the values; here, as the cost function is configured to optimize, the function seeks to minimize the cost function (e.g., determining global minima) for a set of respective estimated depth-elements 52. Thus, the cost function may converge upon these global minima or may approach the minima within a threshold (T).

In block 730 which follows, computer 18 may increment the value t. For example, computer 18 may calculate t=t+1. Thus, for an initial iteration, calculate t now equals 2.

In block 740 which follows, computer 18 may determine whether $s_{\Omega'}^t$ has converged to the minima or whether $s_{\Omega'}^t$ is within a threshold (T) amount of convergence. Convergence may be determined in any suitable manner. For example, each iteration (t) of $s_{\Omega'}^t$ may be compared with a previous value of $s_{\Omega'}^t$. Convergence may be determined based on a lack of change in values of $s_{\Omega'}^t$ or minimal change in value (e.g., less than threshold (T)). In block 740, if convergence or convergence within threshold (T) is determined, the process proceeds to block 650, and if no convergence or no convergence within threshold (T) is determined, then the process may loop back and repeat blocks 720-740 (e.g., until $s_{\Omega'}^t$, suitably converges in block 740).

In block 650 which follows, the super-resolution depth-map 50 ($\hat{x}$) may be generated using the value of $s_{\Omega'}^t$, as shown in Equation (5), where $\hat{x}_\Omega = y_\Omega$ and $\hat{x}_{\Omega'} = s_{\Omega'}^t$.

$\hat{x} = \hat{x}_\Omega \otimes \hat{x}_{\Omega'}$, representing the merger of a set of measured depth-elements 28 with a set of estimated depth-elements 52    Equation (5)

Turning now to FIG. 8, another implementation of block 640, FIG. 6 is shown which enables computer 18 to perform the optimization faster (e.g., FIG. 8 illustrates blocks 640' and 650). In this implementation of block 640', one of Nesterov's methods for solving a convex programming problem with convergence rate $[O(1/k^2)]$ is used. And as block 650 may be identical to that described above in at least one example, only block 640' will be described in detail.

Block 640' may comprise blocks 810, 820, 830, 840, 850, 860, and 870. Block 810 may follow block 630 (FIG. 6), and block 810 may be identical to block 710, except that an additional value may be initialized; namely, $q_0=1$, wherein $q_t$ values may be scalar quantities representing an additional learning rates (e.g., an additional strength value) which is used to expedite determining gradient descent.

In block 820 which follows, computer 18 may determine a value of $z_{\Omega'}^t$ as set forth in Equation (6). As will be apparent from the discussion below, $z_{\Omega'}^t$ may comprise an intermediary value and may be used to calculate $s_{\Omega'}^t$—as described below (see Equation (9)) and with respect to the process shown in FIG. 7. Other variables and functions shown in Equation (6) may be the same as or similar to those described above.

$$z_{\Omega'}^t = s_{\Omega'}^{t-1} - \gamma I_{\Omega'} \nabla f(s^{t-1}) \quad \text{Equation (6)}$$

In block 830 which follows, computer 18 may determine Equation (7).

$$q_t \leftarrow \tfrac{1}{2}(1+\sqrt{1+4q_{t-1}^2}) \quad \text{Equation (7)}$$

In block 840 which follows, computer 18 may determine Equation (8)—using the $q_t$ value determined in Equation (7).

$\lambda_t = (q_{t-1}-1)/q_t$, wherein $\lambda_t$ values also may be scalar quantities representing an additional learning rates (e.g., an additional strength value) which is used to expedite determining gradient descent    Equation (8)

In block 850 which follows, computer 18 may determine Equation (9)—using the values calculated in Equations (6) and (8).

$$s_{\Omega'}^t = (1+\lambda_t)z_{\Omega'}^t - \lambda_t z_{\Omega'}^{t-1} \quad \text{Equation (9)}$$

Block 860 which follows may be identical to block 730; therefore, it will not be re-described herein. Similarly, block 870 which follows may be identical to block 740; therefore, it will not be re-described herein—e.g., except that if no convergence or no convergence within threshold (T) is determined, then the process may loop back and repeat blocks 820-870 (e.g., until $s_\Omega{}'$, suitably converges in block 870).

As discussed above, following block 870, the process may proceed to block 650, which may be the same as described previously. Thus, using block 640', computer 18 may accelerate the determination of convergence, thereby increasing the speed at which computer 18 determines the super-resolution depth-map 50. Accordingly, the frequency of super-resolution depth-map determinations may be increased thereby permitting—e.g., in a vehicle implementation—the vehicle 12 to receive more real-time situational awareness. As used herein, real-time refers to a time-differential between input data (e.g., blocks 610, 620) and output data (e.g., block 650), wherein the time differential between these instances is less than 150 milliseconds.

Thus, using the processes and examples described above, the computer 18 may receive a sparse-depth map (e.g., having low depth resolution) and generate a super-resolution depth-map 50 (e.g., having high depth resolution). Further, the (high-resolution) super-resolution depth-map 50 may have a same or similar resolution as that of the second sensor 16, wherein some of the depth data may be measured, while some of the depth data may be estimated. In some examples, depth data and spatial data may be fused (e.g., one-to-one matching) enhancing the information available to the computer regarding its environment. For example, each of the measured and estimated depth-elements 28, 52 may correspond with a unique pixel location of array 34 of spatial-elements 38 received from the second sensor 16.

Thus, there has been described a depth-resolving system for a vehicle. The system may include a first sensor, a second sensor, and a computer. The first sensor may receive sparse depth data regarding its surroundings, and the computer may calculate a super-resolution depth-map using the sparse depth data and estimated depth data calculated using a gradient-based optimization.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
    determining a plurality of unmeasured depth-map positions using measured depth-elements from a first sensor and spatial-elements from a second sensor;
    for each of the plurality, calculating estimated depth-elements using a gradient-based optimization; and
    generating a super-resolution depth-map that comprises the measured and estimated depth-elements,
    wherein the optimization comprises one of: determining a convergence of $s_{\Omega'}^{t}=s_{\Omega'}^{t-1}-\gamma I_{\Omega'}\nabla f(s^{t-1})$ or determining a convergence of $s_{\Omega'}^{t}=(1+\lambda_t)z_{\Omega'}^{t}-\lambda_t z_{\Omega'}^{t-1}$,
    wherein $s_{\Omega'}^{t}$ is a depth-map estimation, wherein t is an optimization iteration value, wherein $\Omega'$ is a domain, wherein $I_{\Omega'}$ is a sampling matrix of the domain, wherein $\gamma$ is a predetermined scalar,
    wherein $\lambda_t$ is a factor used to improve an efficiency in determining gradient descent, wherein $z_{\Omega'}^{t}$ is an intermediary value.

2. The method of claim 1, wherein the first sensor is a light detection and ranging (LIDAR) device, wherein the second sensor is a camera.

3. The method of claim 1, further comprising registering the spatial-elements with the measured depth-elements, wherein the plurality of unmeasured depth-map positions are indexed positions of an array of the spatial-elements which do not have a corresponding measured depth-element.

4. The method of claim 1, wherein, in the super-resolution depth-map, each of the measured and estimated depth-elements correspond with a unique pixel location of an array of spatial-elements received from the second sensor.

5. The method of claim 1, wherein calculating estimated depth-elements further comprises, with respect to each unmeasured depth-map position, quantifying a strength of a depth discontinuity with respect to neighboring pixel locations.

6. The method of claim 1, wherein the optimization comprises determining a minima of a cost function.

7. The method of claim 1, wherein the optimization comprises:

$$\hat{x} = \arg\min_{x \in X_\Omega} \|Dx\|_{l_2},$$

subject to $x_\Omega = y_\Omega$, wherein $\hat{x}$ is the super-resolution depth-map, wherein x is a multi-dimensional variable representing the depth-map image to be estimated, wherein y comprises a set of measured depth-elements, wherein D is a gradient operator, wherein $\|x\|_{l_2}$ is an $l_2$-norm, and wherein $\Omega$ represents a set of pixel indices associated with the measured depth-elements.

8. The method of claim 1, wherein, when the convergence is determined using of $s_{\Omega'}^{t}=s_{\Omega'}^{t-1}-\gamma I_{\Omega'}\nabla f(s^{t-1})$, then $s_{\Omega'}^{t}$ is repeatedly determined until convergence is determined or convergence within a threshold (T) is determined.

9. The method of claim 1, wherein, when the convergence is determining using of $s_{\Omega'}^{t}=(1+\lambda_t)z_{\Omega'}^{t}-\lambda_t z_{\Omega'}^{t-1}$, then $z_{\Omega'}^{t}$ is repeatedly determined until convergence is determined or convergence within a threshold (T) is determined.

10. The method of claim 1, wherein determining the convergence comprises using a Nesterov method for solving a convex programming problem with a convergence rate $[O(1/k^2)]$, wherein $O(1/k^2)$ is a rate of decay.

11. The method of claim 1, further comprising fusing the super-resolution depth-map with the spatial-elements.

12. The method of claim 1, further comprising navigating a vehicle in an autonomous mode using the super-resolution depth-map.

13. A computer, comprising:
    a processor; and
    memory storing instructions executable by the processor, the instructions, comprising to:
        determine a plurality of unmeasured depth-map positions using measured depth-elements from a first sensor and spatial-elements from a second sensor;
        for each of the plurality, calculate estimated depth-elements using a gradient-based optimization; and
        generate a super-resolution depth-map that comprises the measured and estimated depth-elements,
        wherein the optimization comprises:

$$\hat{x} = \arg\min_{x \in X_\Omega} \|Dx\|_{l_2},$$

subject to $x\Omega = y\Omega$, wherein $\hat{x}$ is the super-resolution depth-map, wherein x is a multi-dimensional variable representing the depth-map image to be estimated, wherein y comprises a set of measured depth-elements, wherein D is a gradient operator, wherein $\|x\|_{l_2}$ is an $l_2$-norm, and wherein $\Omega$ represents a set of pixel indices associated with the measured depth-elements.

14. The computer of claim 13, wherein the instructions further comprise, to: register the spatial-elements received from the second sensor with the measured depth-elements, wherein the plurality of unmeasured depth-map positions are indexed positions of an array of the spatial-elements which do not have a corresponding measured depth-element.

15. The computer of claim 13, wherein, in the super-resolution depth-map, each of the measured and estimated depth-elements correspond with a unique pixel location of an array of spatial-elements received from the second sensor.

16. The computer of claim 13, wherein the instruction to calculate estimated depth-elements further comprises, to: with respect to each unmeasured depth-map position, quantify a strength of a depth discontinuity with respect to neighboring pixel locations.

17. The computer of claim 13, wherein the instructions further comprise, to: determine a convergence with respect to values of the estimated depth-elements; and use a Nesterov method for a respective convergence rate.

* * * * *